(No Model.)
C. F. BOYENS & J. S. BURKHOLDER.
NUT LOCK.
No. 518,049.  Patented Apr. 10, 1894.
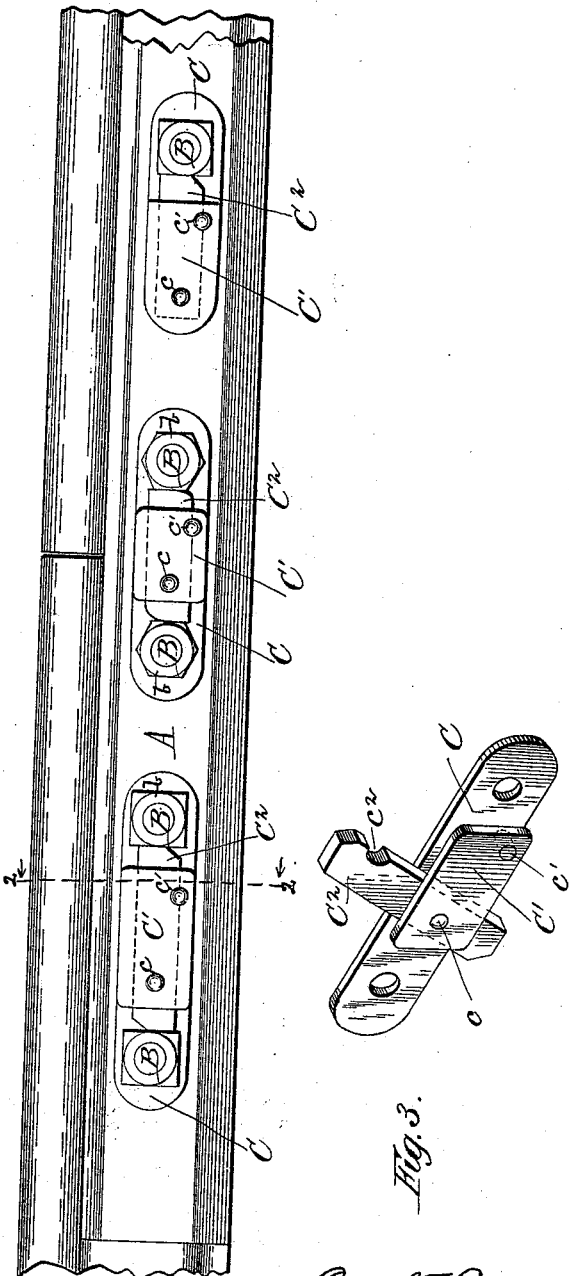
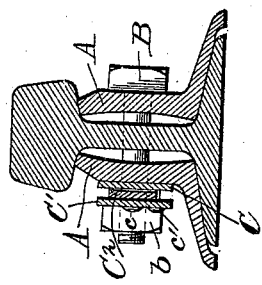
WITNESSES
F. L. Ourand
E. W. Bradford
Carl F. Boyens
Jacob S. Burkholder
INVENTORS
Attorney

UNITED STATES PATENT OFFICE.

CARL F. BOYENS AND JACOB S. BURKHOLDER, OF ALLENTOWN, PENNSYLVANIA.

NUT-LOCK.

SPECIFICATION forming part of Letters Patent No. 518,049, dated April 10, 1894.

Application filed September 23, 1893. Serial No. 486,339. (No model.)

*To all whom it may concern:*

Be it known that we, CARL F. BOYENS and JACOB S. BURKHOLDER, citizens of the United States, residing at Allentown, in the county of Lehigh and State of Pennsylvania, have invented certain new and useful Improvements in Self-Interlocking Nut-Locks; and we do hereby declare the following to be a full, clear, and exact description of the invention, such as will enable others skilled in the art to which it appertains to make and use the same.

Our said invention relates to certain improvements in the details of construction of nut locks, being particularly designed for use in locking the nuts of fish plates on railways, but adapted for a large variety of other uses, as will be hereinafter more particularly described and pointed out.

Referring to the accompanying drawings, which are made a part hereof, and on which similar letters of reference indicate similar parts Figure 1, is a side elevation of a railway rail joint, the nuts on the bolts which secure the fish plates in position being locked by the use of our said invention; Fig. 2, a cross section on the dotted line 2 2 in Fig. 1, and Fig. 3, a perspective view of the nut lock separately.

In said drawings, the portions marked A represent the fish plates, B the bolts and C' and C² the different parts of the nut lock proper. The fish plates A and bolts B with their nuts *b* are, of course, of the usual or any desired form and construction.

The nut lock proper consists of the base plate C and cap plate C', and a locking bar C². Said base plate is formed with perforations to receive the bolts, being thus adapted to serve as a washer also. The cap plate C' is riveted or bolted thereto by bolts or rivets *c* and *c'*. The nut locking plate C², is interposed between said plates C and C' pivoted at one side of its center. The other bolt or rivet *c'* is located to serve as a stop for said locking plate when turned to that position, where it will lock the nuts, said locking plate being preferably formed with a notch $c^2$ in its lower edge adapted to engage said stop.

In the drawings this nut lock is shown in connection with different forms of nuts, and the position it occupies, both before (in Fig. 3.) and after (in Fig. 1.) the nuts are locked, is illustrated.

At the right in Fig. 1, we have shown the invention constructed for use in connection with a single bolt and nut, while in the other plans where it is shown it is of a construction adapted to lock pairs of nuts.

In use, the nut lock is placed in position on the bolts, the plate C serving as a washer, and the locking plate C², being in the position shown in Fig. 3. The nuts are then turned on, tightened and the locking plate turned down as shown in Fig. 1. As will be readily seen, the nuts are thus securely locked from backing. The corners of the locking plate adjacent to that corner of the nut which moves forward as the nuts are tightened are formed tapered or rounded as shown, and thus the nuts are permitted to be still further tightened at any time, the motion of the nut serving to lift the plate sufficiently, while its gravity (secured by placing its pivot to one side of its center) returns it to, and maintains it in the position required to secure the nuts in place.

Having thus fully described our said invention, what we claim as new, and desire to secure by Letters Patent, is—

A nut lock consisting of the base plate C formed to serve as a washer, the cap plate C' connected thereto by the bolts or rivets *c* and *c'*, the locking plate C² pivoted between said plates on said rivet *c*, said rivet *c'* being located to serve as a stop to support said locking plate in the position required to lock said nuts, substantially as set forth.

In testimony whereof we affix our signatures in presence of two witnesses.

CARL F. BOYENS.
    JACOB S. BURKHOLDER.

Witnesses:
 HENRY HARDENSTEIN,
 WM. H. ZINK.